United States Patent [19]

Fukuda et al.

[11] Patent Number: 5,070,180
[45] Date of Patent: Dec. 3, 1991

[54] SHRINKABLE COPOLYESTER FILM

[75] Inventors: Yujiro Fukuda, Machida; Shigeo Utsumi, Yamato; Shinobu Suzuki, Machida, all of Japan

[73] Assignee: Diafoil Company, Ltd., Tokyo, Japan

[21] Appl. No.: 679,140

[22] Filed: Mar. 28, 1991

Related U.S. Application Data

[63] Continuation of Ser. No. 446,141, Dec. 5, 1989, abandoned.

[30] Foreign Application Priority Data

Dec. 7, 1988 [JP] Japan ................................. 63-309439

[51] Int. Cl.$^5$ .............................................. C08G 63/20
[52] U.S. Cl. .................................... 528/272; 528/298; 528/302; 528/308; 528/308.6; 528/502; 528/503; 264/176.1; 264/177.19; 264/210.1; 264/210.7; 264/289.6; 264/290.2
[58] Field of Search ............... 528/272, 298, 302, 308, 528/308.6, 502, 503; 264/176.1, 177.19, 210.1, 210.7, 289.6, 290.2

[56] References Cited

U.S. PATENT DOCUMENTS 4,020,141  4/1977  Quinn et al. ...................... 264/289
4,766,033  8/1988  Yoshimura et al. ................ 428/332

FOREIGN PATENT DOCUMENTS 0210646  4/1987  European Pat. Off. .
0267799  5/1988  European Pat. Off. .

*Primary Examiner*—Maurice J. Welsh
*Assistant Examiner*—S. A. Acquah
*Attorney, Agent, or Firm*—Oblon, Spivak, McClelland, Maier & Neustadt

[57] ABSTRACT

A shrinkable copolyester film having shrinkage of not less than 30% in the direction (main shrink direction) of either the machine direction or the transverse direction after 5 min treatment in an air oven at 100° C., a shrinkage of not more than 20% in the other direction perpendicular to the main shrink direction after 5 min treatment in an air oven at 100° C., an initial shrinkage stress ($F_0$) of not more than 2000 g/mm$^2$ in the main shrink direction during the course of 5 sec after dipped in a silicone oil of 75° C., a shrinkage stress ($F_{20}$) of not less than ($F_0 - 100$) g/mm$^2$, after 20 sec dipping in a silicone oil at 75° C., and a glass transition temperature of 35° to 65° C., is disclosed. The shrinkable copolyester film of the present invention is excellent in shrinkage properties, i.e., substantially free from wrinkles, distortion of film and uneven shrinkage, and is suitable for a shrinkable label for a PET bottle, etc.

6 Claims, No Drawings

SHRINKABLE COPOLYESTER FILM

This application is a continuation of application Ser. No. 07/446,141, filed on Dec. 5, 1989, now abandoned.

BACKGROUND OF THE INVENTION

The present invention relates to a shrinkable copolyester film excellent in shrinking properties, i.e., substantially free from distortion of film, wrinkle of film and uneven shrink after and at the time of shrinking.

Recently, a shrinkable polyester film has become noted because of its potential for solving the problems in the art such as problems in combustion at the time of disposal of films and recovery of films labelled on a polyethylene terephthalate (PET) bottle.

However, the conventional shrinkable polyester film is not sufficient for practical use because distortion and wrinkle appear frequently after shrinking due to precipitous occurrence of shrinking and remarkable lowering of remaining shrinkage stress.

The present inventors have proposed various methods for improving the shrinking properties of shrinkable polyester films in order to solve the above problems. The shrinking properties of the film have been improved to some extents, but still insufficient for practical use.

Especially, when the above film is applied as a label on the PET bottles with particular shapes, for example, rectangular PET bottles, wrinkles or distortion on the shrinked labels are very remarkable. And, the development of a shrinkable polyester film having more improved shrinking properties has been desired.

In view of the above, the present inventors have made further studies for solving the problems in the art and found that a shrinkable copolyester film having a specific glass transition temperature and specific shrinking properties is substantially free from wrinkles, distortion and uneven shrink after and at the time of shrinking and is suitable for a shrinkable label. The present invention has been accomplished based on this findings.

SUMMARY OF THE INVENTION

In an aspect of the present invention, there is provided a shrinkable copolyester film comprising a copolyester derived from 50 to 99 mol %, based on the total mole of acids, of terephthalic acid, 1 to 25 mol %, based on the total mole of acids, of an aliphatic dicarboxylic acid selected from the group consisting of oxalic acid, malonic acid, succinic acid, glutaric acid, adipic acid, pimelic acid, suberic acid, azelaic acid, sebacic acid, and 1,10-decanedicarboxylic acid, 0 to 30 mol %, based on the total mole of acids, of an aromatic dicarboxylic acid selected from the group consisting of phthalic acid, isophthalic acid, naphthalenedicarboxylic acid and diphenyl ether dicarboxylic acid, 70 to 100 mol %, based on the total mole of diols, of ethylene glycol and 0 to 30 mol % of a diol selected from the group consisting of neopentyl glycol, propylene glycol, 1,4-butanediol, trimethylene glycol, tetramethylene glycol, hexamethylene glycol, diethylene glycol, polyalkylene glycol and 1,4-cyclohexane dimethanol, the shrinkage of the film in the direction of either the machine direction or the transverse direction (main shrink direction) after 5 min treatment in an air oven at 100° C. being not less than 30%;

the shrinkage of the film in the other direction perpendicular to said main shrink direction after 5 min treatment in an air oven at 100° C. being not more than 20%;

the initial shrinkage stress ($F_0$) of the film in the main shrink direction being not more than 2000 g/mm² during the course of 5 sec after dipped in a silicone oil at 75° C.;

the shrinkage stress ($F_{20}$) of the film in the main shrink direction after 20 sec dipping in a silicone oil at 75° C. being not less than ($F_0 - 100$) g/mm²; and the glass transition temperature of the film being 35° to 65° C.

DETAILED DESCRIPTION OF THE INVENTION

The copolyester used in the present invention is those in which 50 to 99 mol %, preferably 75 to 98 mol %, of the total dicarboxylic acid components is terephthalic acid and 70 to 100 mol %, preferably 75 to 100 mol % of the total diol components is ethylene glycol.

Dicarboxylic acids used as the comonomer in the present invention include, for example, aliphatic dicarboxylic acids such as 1,10-decanedicarboxylic acid, oxalic acid, malonic acid, succinic acid, glutaric acid, adipic acid, pimeric acid, suberic acid, azelaic acid and sebacic acid, and aromatic dicarboxylic acids such as phthalic acid, isophthalic acid, naphthalenedicarboxylic acid, diphenyl ether dicarboxylic acid. The aliphatic dicarboxylic acids can be used from 1 to 25 mol %, preferably from 2 to 20 mol % of the total dicarboxylic acid components. The aromatic dicarboxylic acids can be used from 0 to 30 mol %, preferably from 0 to 25 mol % of the total dicarboxylic acid components.

Diols used as the comonomer in the present invention include, for example, neopentyl glycol, propylene glycol, 1,4-butanediol, trimethylene glycol, tetramethylene glycol, hexamethylene glycol, diethylene glycol, polyalkylene glycol, 1,4-cyclohexane dimethanol. The above diols can be used from 0 to 30 mol %, preferably from 0 to 25 mol % of the total diol components.

Among these dicarboxylic acid comonomers, aliphatic dicarboxylic acids such as adipic acid, suberic acid, sebacic acid, 1,10-decanedicarboxylic acid are especially preferred to lower the glass transition temperature (Tg) and crystallizability, resulting in lowering of the generation temperature of shrinkage stress and the maximum shrinkage stress in the main shrink direction of the film obtained. The above aliphatic dicarboxylic acid is preferably used in the range from 1 to 25 mol %, more preferably from 2 to 20 mol % of total dicarboxylic acid components. If the content is more than 25 mol %, the film tends to shrink spontaneously owing to remarkable lowering of Tg. On the other hand, if the content is less than 1 mol %, Tg of the film is not lowered to the range required in the present invention.

As other comonomers usable in the present invention, hydroxycarboxylic acids such as p-hydroxybenzoic acid, p-hydroxyethoxybenzoic acid, monofunctional compounds such as benzoic acid, benzoylbenzoic acid, methoxypolyalkylene glycol, polyfunctional compounds such as glycerol, pentaerythritol, trimethylol, trimethylenepropane, can be used in an amount to retain the copolyester linear.

Moreover, it is preferred that fine particles of organic or inorganic lubricants are added in order to improve slipping property. And, stabilizers, coloring agents, antioxidants, defoaming agents, antistatic agents can be also added, if necessary.

The fine particles giving slipping property to the film are, for example, the known inactive additive particles such as kaolin, clay, calcium carbonate, silicon oxide, calcium terephtahlate, aluminum oxide titanium oxide, calcium phosphate, lithium fluoride and carbon black, high melting-point organic compounds and crosslinked polymers which are infusible at a temperature of melt film-formation of copolyester, and internal particles formed in copolyester from metal compounds used as a catalyst for copolyester synthesis such as alkali metal compounds and alkaline earth metal compounds during the synthesis of the copolyester.

The content of the fine particles in the film is usually in the range from 0.005 to 0.9 weight % based on the total weight of the film, and the mean particle size of them is in the range from 0.001 to 3.5 μm.

In the present invention, the heat of fusion of the film is preferably from 1 to 8 cal/g, more preferably from 2 to 6 cal/g. If it is less than 1 cal/g, the drying method generally applied to usual polyethylene terephthalate cannot be adopted in drying step before extruding films. If it is more than 8 cal/g, a film having sufficient shrinkage cannot be obtained.

The intrinsic viscosity of the film in the present invention is preferably 0.50 or more, more preferably 0.60 or more, most preferably 0.65 or more. If it is less than 0.50, sufficient shrinkage can not be obtained because of high crystallinity of the film.

The shrinkage in the main shrink direction of the film in the present invention after treating for 5 minutes at 100° C. in an air oven is necessary to be 30% or more, preferably 40% or more, more preferably in the range from 40 to 65%. Generally, the above main shrink direction is the direction of either the machine direction or the transverse direction of the film. If it is less than 30%, the film does not sufficiently adhere to a container or a bottle, or the film tends to have wrinkles in itself, because of insufficient shrinkage. If it is more than 65%, distortion tends to be generated in the label, because the film rapidly shrinks in its initiation stage.

And, the shrinkage in the direction perpendicular to the main shrink direction of the film in the present invention after treating for 5 minutes at 100° C. in an air oven is necessary to be 20% or less, preferably to be 15% or less, more preferably 10% or less. If it is more than 20%, distortion or curling at the end of the film is generated when shrinking as the label, because the film largely shrinks along the length direction of a container or bottle.

The shrinkage in the main shrink direction of the film in the present invention after treating for 5 minutes at 70° C. in an air oven, is preferably 20% or more, more preferably 30% or more, most preferably 40% or more. If it is less than 20%, uneven shrinkage take place because the delay of the shrinkage partially occurs in the film (for example, at the part of folds when manufactured to a bag) at the initiation stage of the shrinkage.

Moreover, shrinkage stress in the main shrinkage direction of the film of the present invention is necessary to satisfy a certain specific value when treating at 75° C. in silicone oil. The initial value of the shrinkage stress $F_0$ of the film of the present invention is necessary to be 2000 g/mm² or less, preferably to be 1500 g/mm² or less and further preferably 1000 g/mm². The initial value $F_0$ is the value until a lapse of 5 seconds after dipping the film in silicone oil at 75° C. If $F_0$ is more than 2000 g/mm², distortion or wrinkles are generated remarkably when using as a label because the rate of shrinkage in the initial stage of the shrinking is too large.

And, the shrinkage stress $F_{20}$ of the films of the present invention is necessary to be $(F_0-100)$ g/mm² or more, preferably $(F_0-50)$ g/mm² or more, more preferably $F_0$ or more, wherein $F_{20}$ is the value after 20 seconds from dipping the film in silicone oil of 75° C.

From the present inventors studies, it has been found that it is effective for avoiding wrinkles that a specific value or more of the shrinkage stress continuously remains in the main shrink direction of the film even after the completion of shrinking of the label (for example, after 3 to 20 seconds from the initiation of the shrinking in a general shrink tunnel), and the specific value is closely related to the initial peak value of the shrinkage stress. Accordingly, if $F_{20}$ is less than $(F_0-100)$ g/mm², it is difficult in the later stage of the shrinking or after the completion of the shrinking to reform or avoid wrinkles of the film generated in the initial stage of the shrinking.

Glass transition temperature (Tg) of the film of the present invention is in the range from 35° to 65° C., preferably from 40° to 65° C., more preferably from 45° to 60° C. If Tg is more than 65° C., when a film is shrunk in a shrink tunnel of a relatively lower temperature (for example, a label for a PET bottle), uneven shrinkage takes place in the films because wrinkles generated in the initial stage of the shrinking remains after the completion of shrinking by the reason the heat applied the film is insufficient for shrinking the film. If Tg is less than 35° C., the attachment to a container becomes impossible, because the large spontaneous shrinkage occur when storing for a long time before shrinkage process.

The generation temperature of shrinkage stress of the film of the present invention in the main shrink direction is preferably in the range from 40° to 65° C., more preferably from 45° to 65° C. and further preferably 45° to 60° C. If it is less than 40° C., the application as a label to the bottle becomes difficult, because the large spontaneous shrinkage occurs when storing the films for a long time before the shrinkage process. On the other hand, if it is more than 65° C., uneven shrinkage and wrinkles are frequently generated in the films, because it is hard to shrink uniformly owing to the small rate of shrinkage in a shrink tunnel.

The density of the films of the present invention is preferably 1.35 or less, more preferably is in the range from 1.20 to 1.35, most preferably from 1.25 to 1.35. If it is more than 1.35, wrinkles generated during shrinking are hardly to be recovered owing to the stiffness of the film. And, if it is less than 1.20, wrinkles are also generated in the sealing part owing to inferior solvent resistance when sealing with solvent.

The index of birefringence of the film of the present invention is preferably in the range from 0.030 to 0.090, more preferably from 0.040 to 0.080. If it is less than 0.030, the printing property as the film for a label is not sufficient owing to inferior solvent resistance and uneven thickness. And, if it is more than 0.090, the generation temperature of shrinkage stress is unfavorably become higher.

Moreover, the degree of planar orientation of the film of the present invention is preferably in the range from 0.020 to 0.060, more preferably from 0.020 to 0.050. If it is less than 0.020, the solvent resistance and warmwater resistance are poor. On the other hand, if it is more than 0.060, the maximum shrinkage stress of the film in both the main shrink direction and the direction perpendicular thereto unfavorably become higher.

In the film of the present invention, the maximum shrinkage stress in the main shrink direction is preferably 1000 g/mm² or less, more preferably 700 g/mm² or less, most preferably 500 g/mm² or less. If it is more than 1000 g/mm², distortion of the film during shrinking increases.

In the film of the present invention, the maximum shrinkage stress in the direction perpendicular to the main shrink direction at 40° to 100° C., is preferably 50 g/mm² or less, more preferably 30 g/mm² or less. If it is more than 50 g/mm², curlings and wrinkles are frequently generated near the upper end of the label when shrinking.

It is possible that foaming-type ink layer is printed on one or two sides of the film of the present invention. It is also possible to laminate a cellular thermoplastic resin film or sheet on the film of the present invention to provide the film with cushioning properties in order to prevent a bottle from being broken. Herein, any known thermoplastic resins can be used, for example, polyvinyl chloride, polyethylene, polypropylene, polyacrylic resins, polystyrene, polyesters.

The film thickness is not especially limited in the present invention, but the thickness is preferably in the range from 5 to 300 μm, more preferably from 10 to 200 μm for use as a shrinkable label.

The process for producing the film of the present invention is exemplified follows.

A copolyester containing, if necessary, adequate amount of inorganic particles as lubricant is extruded at 200° to 320° C., after drying by usual dryers such as hopper dryers, paddle dryers and vacuum dryers. Any known methods for extrusion such as T die, tubular method, can be used.

After extruding, an amorphous film is obtained by rapid cooling. In the case T die method is used, it is preferred that electrostatic cooling method is employed to obtain a film of an even thickness.

The amorphous film is uniaxially or biaxially stretched with one or more stages in order to provide the characteristic feature of the present invention with the film.

As uniaxial stretching method, it is preferred that the stretching is only carried out in the machine direction by a roll by 2.0 to 6.0 times at 50° to 150° C., or in the transverse direction by a tenter by 2.0 to 6.0 times at 50° to 150° C.

In the case of the biaxial stretching, the stretching is strongly carried out in either of the machine or transverse direction by 2.0 to 6.0 times, and is quite weakly carried out in the other direction by 1.0 to 1.8 times at 50° to 150° C.

As such biaxial stretching method, known methods of continuous biaxial stretching or simultaneous biaxial stretching can be used, moreover restretching can also be carried out after the above stretching.

It is preferred that the stretched films are heat treated at 60° to 100° C. for 0.01 to 60 seconds, more preferably 0.01 to 30 seconds in order to obtain uniform shrinkage. The heat treatment is usually carried out under fixing with tension, and relaxation of 40% or less or tentering can be also employed. As the heat-treatment method, known methods of contacting to the heated roll, and of holding with clips in the tenter can be used. And, restretching can be carried out after heat-treatment.

Especially in the present invention, it is preferred that the heat treatment is carried out so that the lowering of the degree of planar orientation of the heat-treated film is 0.003 or more, preferably 0.006 or more, against that before the heat treatment.

It is possible that the adherence of the film to a printing layer is improved by corona discharge treatment to one or two sides of the film during, before or after the stretching.

And also, it is possible to improve adherence, antistatic properties, slipping properties, light-shielding properties of the film by applying on one or two side of the film during, before or after the stretching.

Thus, the product is obtained by coiling the above film.

As described above, the shrinkable copolyester film having excellent shrinkage properties, i.e., substantially free from distortion, wrinkle, and uneven shrinkage can be obtained.

The present invention will be explained more in detail by following non-limitative examples.

The evaluation methods are as follows.

(1) Intrinsic viscosity of the film [η]

Sample (200 mg) was added to a mixed solvent (20 ml) of phenol/tetrachloroethane (50/50), and after heating at about 110° C. for 1 hour, the measurement was made at 30° C.

(2) Shrinkage (%)

The test film was cut into a 1 cm × 10 cm piece, and after it has been heat shrunk in a geared oven of 70°±2° C. and 100°±2° C. under a non-loaded state for 5 minutes, the shrinkage was determined according to the following formula.

$$\text{Shrinkage} = \frac{10 - L}{10} \times 100 \, (\%)$$

L: length after shrinkage (3) Shrinkage stress of the film (g/mm²)

A sample piece was cut out from the test film so that the sample piece would have a width of 1 cm and a chuck interval of 10 cm and was set on a tensiometer, then, immersed in a silicone oil of 75° C. to measure the shrinkage stress generated. The value per unit cross sectional area of the shrinkage stress generated during 5 sec after immersed in the silicone oil was defined as $F_0$. Also, the value per unit cross sectional area of the shrinkage stress after 20 sec of the immersion was defined as $F_{20}$.

(4) Glass transition temperature (Tg) of the film

A sample film was fused by heating at 300° C. for 5 min under an atmosphere of $N_2$ gas and was rapidly cooled to make amorphous. By using this sample, Tg was measured by a differential calorimeter SSC 580 DSC 20 (product of Seiko Denshi Kogyo K.K.) at a rate of temperature rise of 4° C./min.

Tg was defined as an arithmetic mean of $T_1$, a temperature at which the base line began to incline to the heat-absorbance side and $T_2$, a temperature at which the line comes to a new base.

(5) Maximum shrinkage stress and generation temperature of shrinkage stress (main shrink direction)

These were measured by using INTESCO 2001 of Intesco Co., Ltd., using a sample piece cut out from the test film so that the sample piece would have a width of 1 cm and a chuck interval of 10 cm, by heating the sample piece at a rate of 10° C./min.

Regarding the maximum shrinkage stress, there was determined the greatest shrinkage stress at 40° to 100° C. in the main shrink direction. As for the generation temperature of shrinkage stress, the temperature at which shrinkage stress became 5 g/mm² or greater in the main shrinkage direction was referred to as the generation temperature of shrinkage stress.

(6) Index of birefringence Δn

Retardation was measured by a polarization microscope made by Karl Zeiss Inc., and the index (Δn) was determined from the following formula.

Δn = R/d
R: retardation
d: film thickness (7) Degree of planar orientation ΔP

The refractive index of the film was measured by an Abbe's refractometer mfd. by Atago Co., Ltd., using a sodium lamp as light source.

The maximum refractive index nγ in the film plane, the refractive index nβ in the direction orthogonal thereto, and the refractive index nα in the thickness direction were measured, and the degree of planar orientation ΔP was determined from the following formula.

$$\Delta P = \frac{1}{2}(n_\gamma + n_\beta) \cdot n_\alpha$$

(8) Density of the film ρ (g/cm²)

By the density gradient tube composed of a mixed solution of n-heptane and carbon tetrachloride, the density of the film was measured.

(9) Shrink characteristics of film

The test film was printed as a shrinkable label and made into a tubular form. This tubular film (label) was attached to a rectangular PET bottle and allowed to pass through a shrink tunnel kept at 150° C. by 10 sec, after which the finish of shrinkage of the film was visually evaluated in terms of the following three points: wrinkling, curling at the end, and non-uniformity in shade of printed image, and graded by the marks of ◎, Δ and x regarding each of the three points. ◎ indicates that the film was substantially free of defect, ○ indicates that the film had a slight defect but was capable of practical use, and x indicates that the film had so much of defect that it was incapable of practical use. Also, a total evaluation was made of shrink characteristics by considering the evaluations on the three points and expressed by the marks of ○ (satisfactory) and x (unsatisfactory).

EXAMPLE 1

A copolyester, the dicarboxylic acid component of which comprises 83 mol % of terephthalic acid unit, 14 mol % of isophthalic acid unit and 3 mol % of sebacic acid unit and the diol component of which comprises 97 mol % of ethylene glycol unit and 3 mol % of diethylene glycol unit, containing 300 ppm of amorphous silica of 1.2 μm particle size and having [η] of 0.66 and Tg of 61° C. was dried by a usual method, extruded from an extruder at 280° C., then, solidified with a rapid cooling to obtain an amorphous film.

The amorphous film was stretched in the machine direction by 1.1 times between a heating roll at 90° C. and a cooling roll, stretched in the transverse direction by 2.0 times at 120° C. and further by 2.3 times at 65° C. in a tenter, and then heat-treated at 82° C. for 5 sec. During the heat treatment, the film was subjected to relaxation by 3% in the transverse direction and 0.2% in the machine direction.

The final film obtained after cooling had a thickness of 45 μm, Δn of 0.062 and ΔP of 0.040.

COMPARATIVE EXAMPLE 1

A copolyester, the dicarboxylic acid component of which comprises terephthalic acid unit and the diol component of which comprises 88 mol % of ethylene glycol unit and 12 mol % of neopentyl glycol unit, containing 500 ppm of fine calcium carbonate particles of 1.0 μm average particle size and having [η] of 0.68 and Tg of 72° C. was subjected to pre-crystallization treatment, dried, extruded from an extruder at 290° C., and solidified with rapid cooling to obtain an amorphous film.

The amorphous film was stretched in the machine direction by 1.2 times at 85° C., 4.2 times in the transverse direction, and then, subjected to tentering by 1.2 times with cooling.

The average thickness of the film obtained was 30 μm, Δn was 0.082 and ΔP was 0.062.

EXAMPLE 2

A copolyester, the dicarboxylic acid component of which comprises 86 mol % of terephthalic acid unit and 14 mol % of 1,10-decanedicarboxylic acid unit and the diol component of which comprises ethylene glycol, containing 700 ppm of fine crosslinked polymer particles of 0.6 μm average particle size and having [η] of 0.72 and Tg of 50° C. was extruded and cooled in the same manner as in Comparative Example 1 to obtain an amorphous film.

The amorphous film was stretched in the machine direction by 2.0 times by a heating roll of 110° C., 2.0 times in the machine direction by a heating roll of 75° C. and then heat-treated for 0.5 sec by contacting the film with a heating roll of 85° C. During the heat treatment, the film was subjected to relaxation by 1% in the machine direction and 10% in the transverse direction.

The film obtained after cooling had an average thickness of 50 μm, Δn of 0.065 and ΔP of 0.041.

COMPARATIVE EXAMPLE 2

A copolyester, the dicarboxylic acid component of which comprises 95 mol % of terephthalic acid unit and 5 mol % of isophthalic acid unit and the diol component of which comprises ethylene glycol unit, containing the same fine particles as used in Example 2 and having [η] of 0.68 and Tg of 68° C. was dried, extruded and rapidly cooled in the same manner as in Example 2 to obtain an amorphous film.

The amorphous film was stretched, heat-treated and cooled in the same manner as in Example 2 to obtain a film having an average thickness of 50 μm, Δn of 0.069 and ΔP of 0.048.

EXAMPLE 3

A copolyester, the dicarboxylic acid component of which comprises 60 mol % of terephthalic acid unit, 20 mol % of isophthalic acid unit and 20 mol % of adipic acid unit and the diol component of which comprises 98 mol % of ethylene glycol and 2 mol % of diethylene glycol, was mixed with a polyethylene terephthalate containing 1000 ppm of amorphous silica of 1.2 μm average particle size in a weight ratio of 50/50, vacuum dried, extruded at 280° C. and then solidified with rapid cooling to obtain an amorphous film having [η] of 0.70 and Tg of 59° C.

The amorphous film was stretched in the same manner as Example 1 to obtain a film of an average thickness of 45 μm.

The results obtained in the above Examples and Comparative Examples are collectively shown in Table 1 together with the results of film evaluation.

TABLE 1

|  | Shrinkage (%) | | | | Shrinkage stress (g/mm$^2$) | | Tg (°C.) | Generation temperature of shrinkage stress (°C.) | Density ρ (g/cm$^3$) | Shrinkage property | | |
|---|---|---|---|---|---|---|---|---|---|---|---|---|
|  | 70 (°C.) | | 100 (°C.) | | | | | | | | | Total |
|  | MD* | TD* | MD | TD | $F_0$ | $F_{20}$ | | | | Wrinkle | Shade of printing | evaluation |
| Example 1 | 1 | 42 | 4 | 54 | 830 | 880 | 61 | 59 | 1.32 | ○ | ○ | ○ |
| Comparative Example 1 | −1 | 26 | 8 | 64 | 2180 | 1750 | 72 | 61 | 1.26 | x | Δ~x | x |
| Example 2 | 51 | −1 | 57 | −1 | 900 | 920 | 50 | 52 | 1.31 | ○ | ○ | ○ |
| Comparative Example 2 | 7 | 0 | 28 | 4 | 820 | 780 | 69 | 66 | 1.36 | x | x | x |
| Example 3 | 2 | 46 | 5 | 56 | 780 | 820 | 59 | 57 | 1.33 | ○ | ○ | ○ |

Note: MD is machine direction and TD is transverse direction.

What is claimed is:

1. A shrinkable copolyester film comprising a copolyester derived from 50 to 99 mol %, based on the total mole of acids, of terephthalic acid, 1 to 25 mol %, based on the total mole of acids, of an aliphatic dicarboxylic acid selected from the group consisting of oxalic acid, malonic acid, succinic acid, glutaric acid, adipic acid, pimelic acid, suberic acid, azelaic acid, sebacic acid and 1,10-decanedicarboxylic acid, 0 to 30 mol %, based on total mole of acids, of an aromatic dicarboxylic acid selected from the group consisting of phthalic acid, isophthalic acid, naphthalenedicarboxylic acid and diphenyl ether dicarboxylic acid, 70 to 100 mol %, based on the total mole of diols, of ethylene glycol and 0 to 30 mol % of a diol selected from the group consisting of neopentyl glycol, propylene glycol, 1,4-butanediol, trimethylene glycol, tetramethylene glycol, hexamethylene glycol, diethylene glycol, polyalkylene glycol and 1,4-cyclohexane dimethanol, the shrinkage of the film in the direction of either the machine direction or the transverse direction (main shrink direction) after 5 min treatment in an air oven at 100° C. being not less than 30%; the shrinkage of the film in the other direction perpendicular to said main shrink direction after 5 min treatment in an air oven at 100° C. being not more than 20%; the initial shrinkage stress ($F_0$) of the film in the main shrink direction being not more than 2000 g/mm$^2$ during the course of 5 sec after dipped in a silicone oil at 75° C.; the shrinkage stress ($F_{20}$) of the film in the main shrink direction after 20 sec dipping in a silicone oil at 75° C. being not less than ($F_0$−100) g/mm$^2$; and the glass transition temperature of the film being 35° to 65° C.

2. The shrinkable copolyester film according to claim 1, wherein said aliphatic dicarboxylic acid is selected from the group consisting of adipic acid, suberic acid, sebacic acid and 1,10-decanedicarboxylic acid.

3. The shrinkable copolyester film according to claim 1 or 2, the shrinkage of said film in the main shrink direction after 5 min treatment in an air oven at 70° C. is not less than 20%.

4. The shrinkable copolyester film according to claim 1 or 2, wherein the index of birefringence of said film is 0.030 to 0.090 and the degree of plannar orientation of said film is 0.020 to 0.060.

5. The shrinkable copolyester film according to claim 1 or 2, the generation temperature of shrinkage stress of said film in the main shrink direction is 40° to 65° C.

6. The shrinkable copolyester film according to claim 1 wherein the glass transition temperature of the film is 45° to 60° C.

* * * * *